United States Patent [19]
Tsuda et al.

[11] Patent Number: 5,770,937
[45] Date of Patent: Jun. 23, 1998

[54] STEPPING MOTOR DRIVING DEVICE

[75] Inventors: Yutaka Tsuda; Hirotake Nozaki, both of Kawasaki, Japan

[73] Assignee: Nikon Corporation, Tokyo, Japan

[21] Appl. No.: 890,800

[22] Filed: Jul. 11, 1997

[30]     Foreign Application Priority Data

Aug. 21, 1996 [JP] Japan .................................... 8-219774

[51] Int. Cl.⁶ ...................................................... H02P 7/00
[52] U.S. Cl. ........................................... 318/685; 318/439
[58] Field of Search ..................................... 318/685, 696, 318/254, 434, 138, 63 C

[56]                References Cited

U.S. PATENT DOCUMENTS

| | | | |
|---|---|---|---|
| 3,555,254 | 1/1971 | Gerber ................................. | 235/151.11 |
| 4,618,808 | 10/1986 | Ish-Shalom et al. ................... | 318/696 |
| 4,638,230 | 1/1987 | Lee ........................................ | 318/632 |
| 5,015,937 | 5/1991 | Wright et al. ........................... | 318/696 |
| 5,038,088 | 8/1991 | Arends et al. .......................... | 318/434 |
| 5,208,523 | 5/1993 | Harman ................................... | 318/685 |
| 5,274,313 | 12/1993 | Amrhein ................................. | 318/629 |
| 5,311,111 | 5/1994 | Karpol et al. ........................... | 318/685 |
| 5,640,075 | 6/1997 | Brasseur et al. ....................... | 318/685 |
| 5,659,234 | 8/1997 | Cresens .................................. | 318/696 |

*Primary Examiner*—Jonathan Wysocki
*Attorney, Agent, or Firm*—Morgan, Lewis & Bockius LLP

[57]            ABSTRACT

A stepping motor driving device which is capable of correcting a micro step moving angle during micro step driving. This stepping motor driving device includes a motor control portion for giving instruction as to a moving amount, a CPU for outputting the number of motor drive pulses according to a moving amount instructed by the motor control portion, a motor drive circuit for driving a motor according to the motor drive pulses and a memory for storing a pulse number showing an actual moving angle closest to an ideal moving angle as a correction pulse number corresponding to a micro step angle based on an error between an actual moving angle and the ideal moving amount with respect to each micro step angle within a full step angle. The CPU outputs pulses in the correction pulse number stored in the memory correspondingly to the micro step angle to the motor drive circuit in order to perform micro step driving by the micro step angle.

7 Claims, 8 Drawing Sheets

FIG. 8 ial No. 8-219774 which is hereby incorporated by reference.

STEPPING MOTOR DRIVING DEVICE

This application claims the benefit of Japanese Application No. 8-219774 which is hereby incorporated by reference.

BACKGROUND OF THE INVENTION

1. Field of the Invention

The present invention relates to a stepping motor driving device, and more particularly to a stepping motor driving device which is capable of improving the rotational positioning accuracy of a stepping motor driven in micro steps.

2. Description of the Related Art

The stepping motor which is precisely rotated by an angle unit called as "1 full step" may be driven in micro steps in order to improve the resolution of a moving angle and prevent vibration. Micro step driving is a driving system for controlling the winding wire current of each phase of the motor in stages by an angle unit smaller than 1 full step.

Figure 1A:
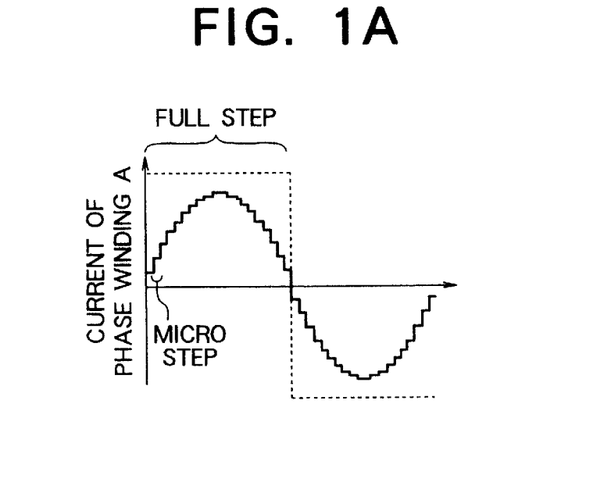
Fig. 1(A) is a graph of a current of an A phase winding wire for illustration of micro step driving of a stepping motor.
Figure 1B:
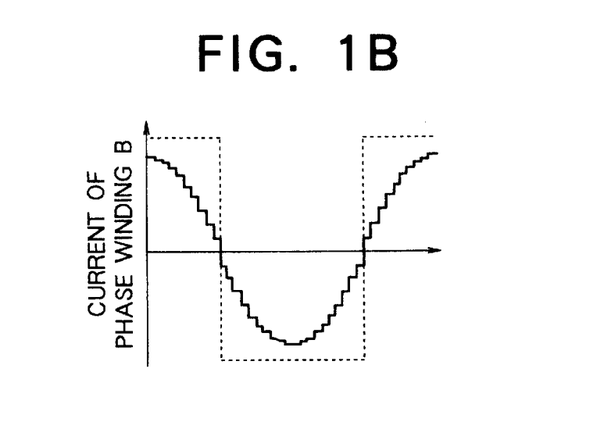
FIG. 1(B) is a graph of a current of a B phase winding wire for illustration of micro step driving of the stepping motor.
Figure 1C:
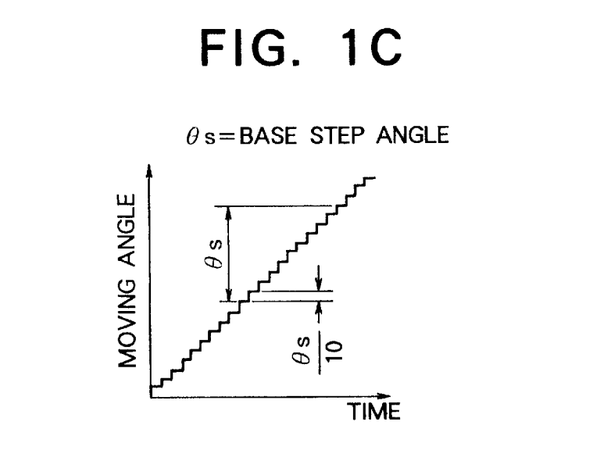
FIG. 1(C) is a graph of a moving angle for illustration of micro step driving of the stepping motor.

This micro step driving will be described by taking two-phase excitation bipolar driving as an example. FIGS. 1A and 1B are graphs respectively showing currents of A and B phase winding wires. FIG. 1C is a graph showing a moving angle.

It can be understood from FIGS. 1A and 1B that if the torque and angle characteristics of the stepping motor show sine waves in form, the resolution of a moving angle can be increased and smooth rotation can be realized by supplying a sine wave winding wire current in which 1 full step is divided into several parts by a control circuit.

Figure 3:
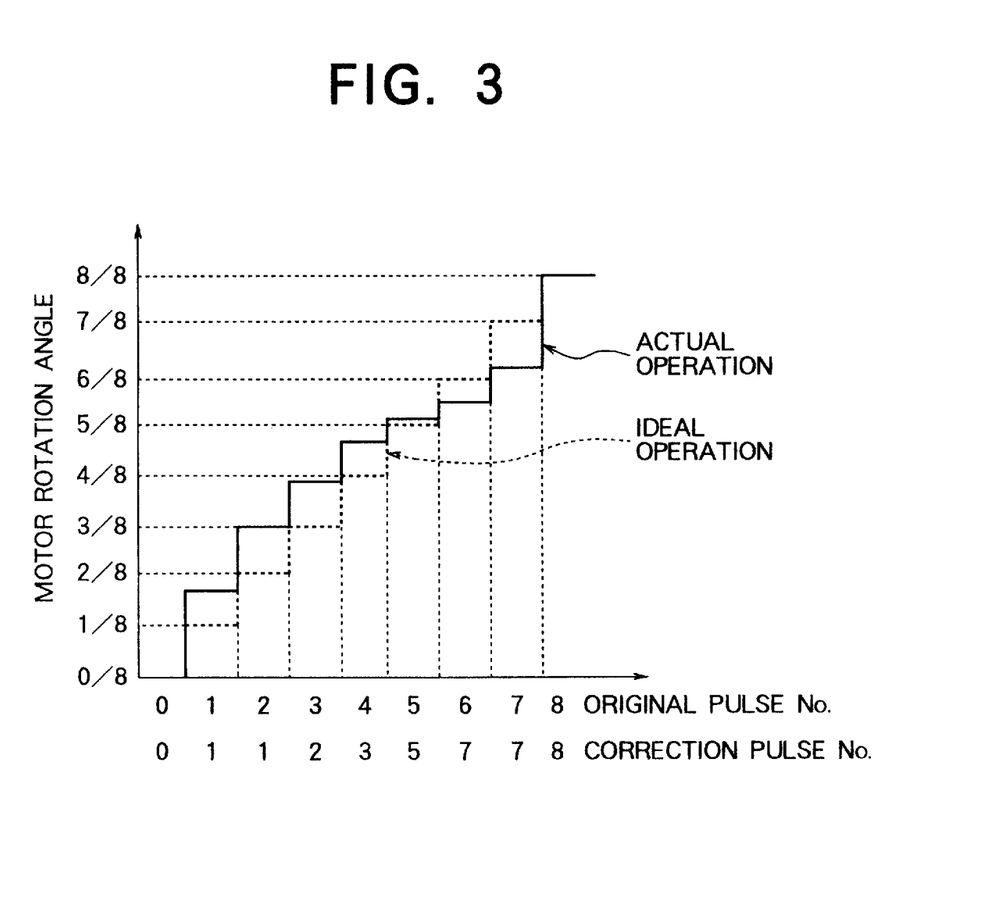
FIG. 3 is a graph illustrating a driving error during micro step driving of the stepping motor.

Actually, however, because of various causes including a difference in motor winding wire structures, compatibility between the motor and a winding wire current control circuit and so on, as shown by a graph in FIG. 3, the stepping motor may not be always rotated by a step angle in which 1 cycle is divided into equal parts even by dividing 1 full step and supplying a winding wire current according to an accurate sine wave. FIG. 3 is a graph showing an ideal operation by a broken line and an actual operation by a solid line. It can be understood from the graph that there is an error between an actual rotation angle and an ideal rotation angle.

Such an error results in a problem of less precision, and so on, in open control and the generation of hunting, convergence delaying and other failures in closed control.

SUMMARY OF THE INVENTION

In order to solve the above-described problems and failures, the object of the present invention is to provide a stepping motor driving device which is capable of correcting a micro step moving angle during micro step driving.

In a stepping motor driving device for driving a stepping motor in micro steps according to the present invention, the improvement comprising instructing means for issuing instruction as to the moving amount of the stepping motor; control means for outputting the number of motor driving pulses depending on the motor moving amount instructed by the instructing means; a motor drive circuit for driving the stepping motor in response to the motor driving pulses; and correction pulse number storing means for storing a motor driving pulse number as a correction pulse number corresponding to a micro step angle, based on an error between an actual moving angle and the ideal moving angle with respect to each micro step angle within the full step angle of the stepping motor, the motor driving pulse number showing an actual moving angle closest to an ideal moving angle as a correction pulse number corresponding to a micro step angle, wherein in order to perform micro step driving having a micro step angle smaller than the full step angle of the stepping motor, the control means outputs the motor driving pulses of the correction pulse number to the motor drive circuit, the motor driving pulses being stored in the correction pulse number storing means corresponding to the micro step angle.

With the stepping motor driving device of the present invention, the output number of motor driving pulses is corrected so as to bring an actual moving amount close to an ideal moving amount during a micro step operation having a moving amount smaller than that of a full step. For example, when an ideal moving angle is to be obtained by three motor driving pulses, if in practice an actual moving angle obtained by two pulses is closer to an ideal moving angle than an actual moving angle obtained by the three pulses is, "2" is stored in the storing means as a correction pulse number for obtaining the micro step angle. During an actual motor driving operation, two motor driving pulses are output for driving of the objective micro step angle. Accordingly, a micro step operation error can be reduced and an actual moving amount can be brought close to an ideal moving amount.

In the foregoing stepping motor driving device of the present invention, if an error between an actual moving angle and an ideal moving angle for each micro step angle within a full step angle is reproducible in each full step, the correction pulse number storing means may store a correction pulse number only for each micro step angle within the range of 1 full step. In this way, the necessary memory capacity of the storing means can be reduced and making reference to the storing means can be facilitated.

The correction pulse number storing means may preferably store a first correction pulse number necessary for moving from a phase position to the boundary of a next full step, and the correction pulse storing means may preferably also a second correction pulse number necessary for moving from the full step boundary to the phase position according to each phase position.

The motor drive circuit supplies a phase detection signal indicating a current phase position to the control means. The control means divides the moving amount into first, second and third angles in response to the phase detection signal, the first angle being a micro step angle from the current phase position to the boundary position of a next full step, the second angle being an angle of an integral multiple of a full step angle and the third angle being a remaining micro step angle. The control means computes correction pulse numbers for the first and third angles by referring to the correction pulse number storing means. Accordingly, a total correction pulse number for the instructed moving amount can be easily computed. Moreover, a reduction in the responding speed of the motor driving device of the present invention can be prevented.

For the correction pulse number stored in the correction pulse number storing means, one computed beforehand is repeatedly used. However, there may be provided, for example, means for detecting an actual moving angle against an ideal moving angle in each phase position within 1 full step angle and means for determining the correction pulse number based on an error between the ideal moving amount and the actual moving amount obtained by the means for detecting the actual moving angle, and a correction pulse number computed for each power input may be stored again at a specified point of time. Accordingly, highly precise micro step driving can always be provided according to changes with the lapse of time in the characteristics of the motor and the driving circuit.

BRIEF DESCRIPTION OF THE DRAWINGS

For a more complete understanding of the present invention and the advantages thereof, reference is now made to the following description taken in conjunction with the accompanying drawings.

DETAILED DESCRIPTION OF THE PREFERRED EMBODIMENTS

The preferred embodiments of the present invention will be described in detail below. This embodiment of the present invention is an application of micro step driving to lens position control for automatic focusing of a camera. It is needless to say, however, that the present invention can be utilized for other optional purposes in which fine adjustment for positioning is performed by a stepping motor.

Figure 2:
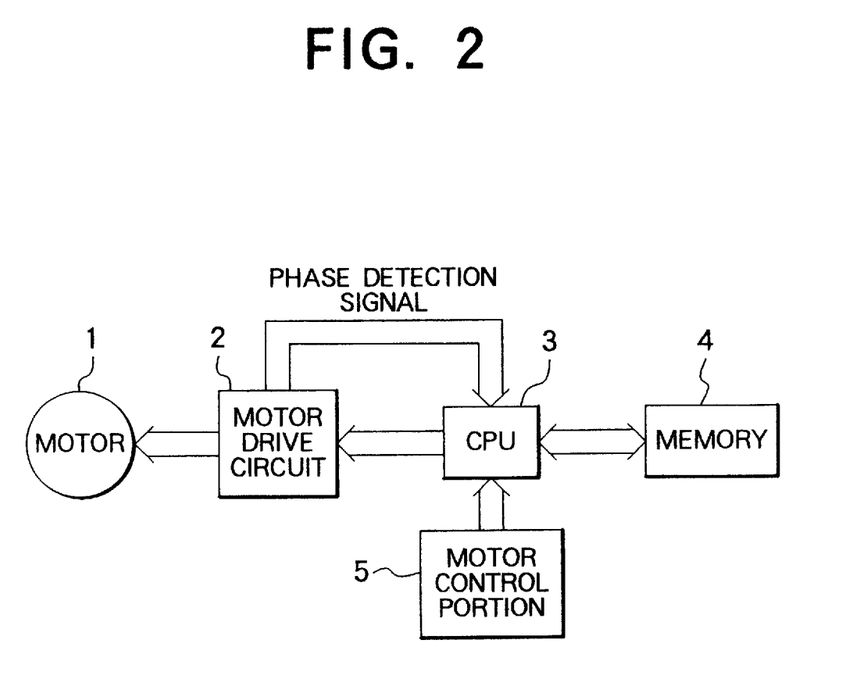
FIG. 2 is block diagram showing a constituting example of a stepping motor driving device of the present invention.

Referring now to FIG. 2, there is shown in outline a constitution of an embodiment of a stepping motor driving device provided by the present invention. This driving device is composed of a motor drive circuit 2 for driving a stepping motor 1; a motor control portion 5 for outputting a control signal including instruction as to the moving angle of the motor 1; a CPU 3 for controlling the motor drive circuit 2 by receiving the control signal and a memory 4 referred by the CPU 3. The motor drive circuit 2 controls each winding wire current of the motor 1 and thereby rotates the motor 1 only by an instructed moving angle (moving amount). The motor drive circuit 2 also produces a phase detection signal, later described, and supplies this signal to the CPU 3. The memory 4 stores programs executed by the CPU 3 and correction data, later described.

In the device of FIG. 2, in accordance with the moving amount instructed by the control signal set in the motor control portion 5, the CPU 3 refers the correction data stored in the memory 4 and computes a motor driving pulse number necessary for rotation of the instructed moving amount. The CPU 3 then sends out motor driving pulses equivalent to this computed pulse number to the motor drive circuit 2, whereby the stepping motor 1 is rotated.

The phase detection signal sent out by the motor driver circuit 2 to the CPU 3 enables the CPU 3 to recognize the current phase position of the micro step driving of the motor 1 in an initial state (at the time of power input). "Phase position" means what number of phase positions within 1 full step the current position of the motor is in. For example, for micro step driving in which a full step is divided into 8 parts, there are 8 phase positions from 0/8 to 7/8. The phase position 0/8 corresponds to a full step position, in other words in the boundary position between full steps.

By referring to FIG. 3, correction of the pulse numbers for stepping motor driving will be described again taking the division of a full step into 8 parts as an example. In this case, 8 motor driving pulses are necessary for the movement (rotation) of 1 full step angle. Actual moving angles of the motor 1 and ideal moving angles respectively obtained by each of 0 to 8 pulse numbers are shown below side by side. The example shown herein is one in which full step moving angles are normalized by 18°.

| PULSE NUMBER | 0 1 2 3 4 5 6 7 8 |
|---|---|
| ACTUAL MOVING ANGLE | 0 3.83 6.75 8.78 10.58 11.46 12.38 13.95 18.00 |
| IDEAL MOVING ANGLE | 0 2.25 4.50 6.75 9.00 11.25 13.50 15.15 18.00 |

It is obvious that the actual micro step angles are different from the ideal micro step angles.

The result of pulse number correction performed by making a comparison between the actual moving amounts and the ideal moving amounts so as to bring the former approximate to the latter is as follows:

| ORIGINAL PULSE NUMBER | 0 1 2 3 4 5 6 7 8 |
|---|---|
| CORRECTION PULSE NUMBER | 0 1 1 2 3 5 7 7 8 |
| CORRECTION MOVING ANGLE | 0 3.83 3.83 6.76 8.78 11.46 13.95 13.95 18.00 |
| IDEAL MOVING ANGLE | 0 2.25 4.50 6.75 9.00 11.25 13.50 15.75 18.00 |

The value of "CORRECTION MOVING ANGLE" corresponding to each original pulse number is one most approximate to the ideal moving angle for the original pulse number, which is selected from the above-noted values of the plurality of actual moving angles. For example, while an ideal moving angle of 4.50° corresponding to a phase position 2/8 is normally obtained by two pulses ( ideal pulse number "2"), as one approximate to the ideal moving angle of 4.50°, there are only actual moving angles of 3.83° (corresponding to a pulse number "1") and 6.75° (corresponding to a pulse number "2"). Accordingly, the pulse number "1" corresponding to 3.83° which is more approximate to the ideal moving angle of 4.50° is selected as a correction pulse number. Similarly, in order to obtain an ideal moving angle of 6.75° in a phase position 3/8 which corresponds to an ideal pulse number "3", a correction pulse number of "2", not "3", is selected. In a phase position 5/8 corresponding to an ideal pulse number "5", ideal and correction pulse numbers are both "5". In a phase position 6/8 corresponding to an ideal pulse number 6, a correction pulse number is "7" which is larger than an ideal pulse number of "6".

It is now recommended to make reference to a relationship between an original pulse number and a correction pulse number for each phase position of 1 full step of a motor moving angle, which is shown in the lower part of FIG. 3.

It should be noted, however, that the columns of these numerical values are only for the purpose of explanation, different values may emerge in practice depending on the type of a stepping motor 1 and there may be some deviation from these values depending on an individual motor and a motor drive circuit even if the motor of the same type is used.

Figure 6:
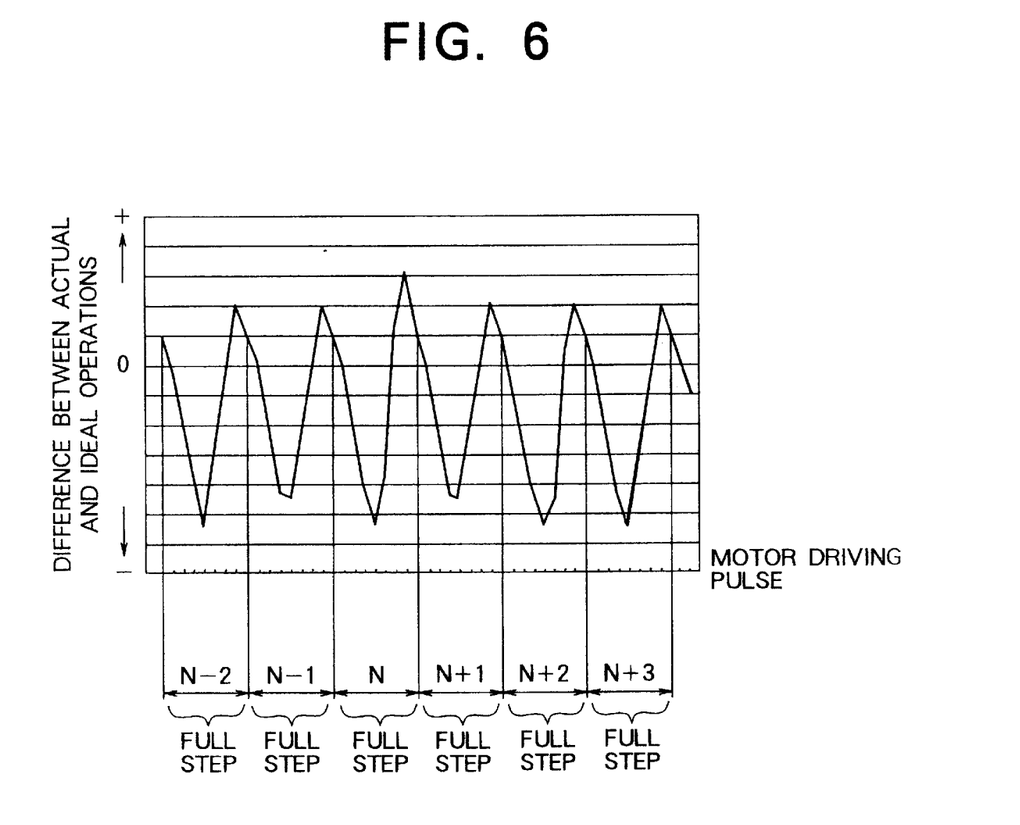
FIG. 6 is a graph showing a cyclic appearance of a driving error during micro step driving of the stepping motor.

Referring now to FIG. 6 which is a graph showing deviation of the actual moving angle of a micro step within each full step of the stepping motor 1 from an ideal moving angle, it can be understood that the amount of deviation of an N th full step from an N+n th (n is an integer) full step has reproducibility. According to the embodiment, correction data corresponding to the amount of deviation equivalent to 1 full step is only stored beforehand based on near coincidence in deviation amount between the phase positions within these full steps and then a pulse number to be supplied to the motor 1 is corrected based on this stored data.

Figure 5:
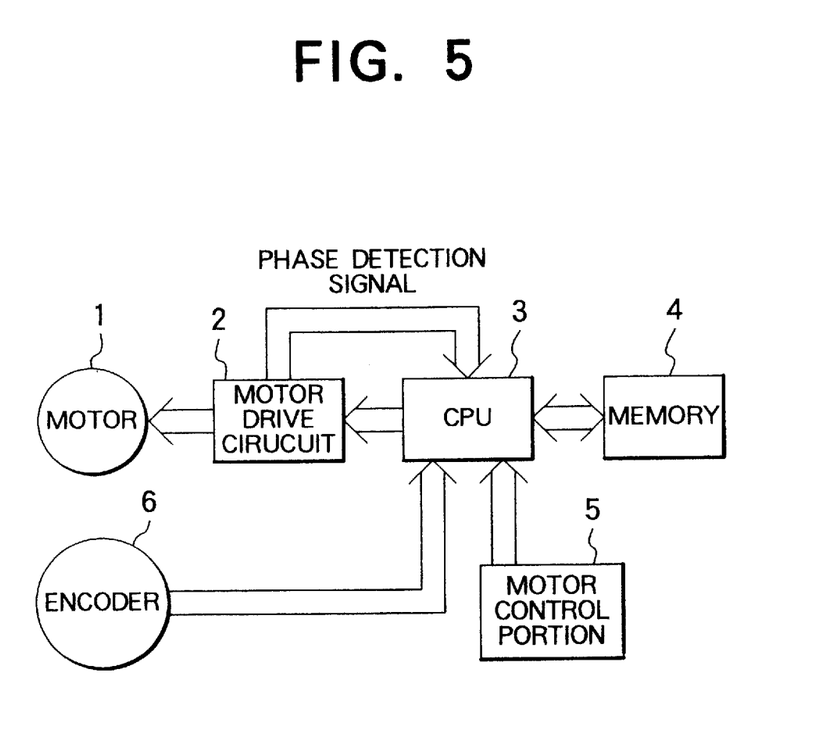
FIG. 5 is a block diagram showing another constituting example of the stepping motor driving device of the present invention.

Referring now to FIG. 5 which is a block diagram showing a device constitution for computing the amount of deviation used as basic data to determine correction data (correction pulse data), that is, the amount of deviation of an actual moving angle from an ideal moving angle in each phase position within a full step, an encoder 6 is shown to be used and with this encoder, an actual moving angle with respect to an ideal moving angle is detected for each phase position of the motor 1. Other constituting elements are the same as those of the device constitution of FIG. 2. To explain an operation in a specific manner, an actual moving angle of the motor 1 with respect to each ideal moving angle is measured by the encoder 6 at the time of resetting or during the initial driving period of the motor 1 and the CPU 3 computes an error between this actual moving angle and the ideal moving angle as the amount of deviation. Then, the CPU 3 determines an actual pulse number showing an actual moving angle most approximate to an ideal moving angle corresponding to each ideal pulse number as a correction pulse number for obtaining its ideal moving angle (or a moving angle most approximate to the ideal moving angle). The obtained correction pulse number is stored in the memory 4 correspondingly to each ideal pulse number (i.e., each phase position).

After the obtained correction pulse number has been stored in the memory 4, if the memory 4 is a nonvolatile type (ROM, a magnetic disk or the like), re-measuring of an actual moving angle by the encoder 6 is not necessary. However, measuring of an actual moving angle may be performed at each specified point of time, for instance at the time of power inputting.

By using a memory 4 in which identical correction data has been stored, the stepping motor of an identical type having a similar deviation characteristic can be constituted without an encoder 6 as in the case of the constitution shown in FIG. 2. However, to be exact, since even in the identical stepping motor, deviation of a micro step angle is different from motor to motor, deviation amount measuring should preferably be performed by the encoder 6 for each motor in order to obtain more accurate deviation amount correction.

Figure 7:
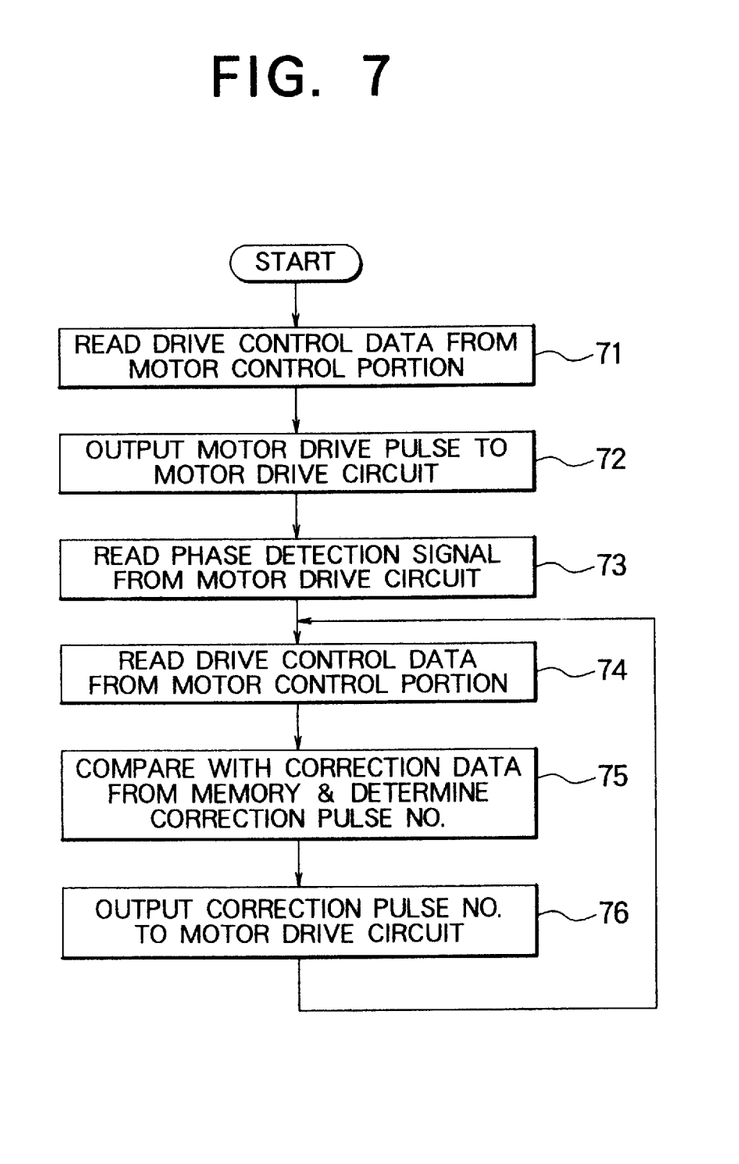
FIG. 7 is a flow chart showing a CPU operation in the device of FIG. 2.

Referring now to FIG. 7, there is shown a flow chart illustrating the operation of the CPU 3 in the device constitution of FIG. 2. This operation flow is started by inputting power to the device.

First, drive control data is read from the motor control portion 5 (step 71). This drive control data is used, as described above, to issue instruction as to how much and in what direction movement (rotation) should be made. The number of motor drive pulses corresponding to the obtained drive control data are output to the motor drive circuit 2 (step 72). The motor drive circuit 2 controls the winding wire current of the motor 1 in response to these motor drive pulses and rotates the motor 1 only by an angle which has been instructed. Then, the CPU 3 reads in a phase detection signal from the motor drive circuit 2 (step 73). This phase detection signal denotes a phase position in which the motor 1 has been stopped after having been rotated in response to the motor drive pulse output in step 72. The detection of this phase position can be performed by first motor driving after the power input. Accordingly, the motor drive pulses in step 72 have not been corrected yet. However, since this operation is performed during an initializing operation or the like in practice, the operation has no direct influence on control performed by the device of the present invention.

In subsequent steps 74 to 76, processing is executed based on an infinite loop. First, next drive control data is read in from the motor control portion 5 (step 74). This drive control data is compared with correction data from the memory 4 a correction pulse number is determined (step 75). The specific method of deciding a correction pulse number will be described later. The number of correction pulses equivalent to the obtained correction number are output to the motor drive circuit 2 (step 76). Thereafter, the process returns to step 74 and the operations of steps 74 to 76 are repeated.

A reason for reading the phase detection signal from the motor drive circuit 2 in step 73 is as follows. In the case of micro step driving, if driving of the motor 1 is for movement from a boundary position between full steps (e.g., 0/8 in the case of division into 8 parts) to a boundary position between other full steps, since movement is made only by an amount equivalent to a multiple of a precise full step rotation angle, pulse number correction is not necessary. For example, when movement is to be made only by an angle equivalent to 10 full steps, in the case of division into 8 parts, it is only necessary to output pulses amounting to 10×8=80 in number. However, if a phase position for micro step driving is in a middle position within 1 full step (e.g., 1/8, 2/8, . . . , 7/8) at the time of starting motor 1 driving or at the time of stopping, the proportional distribution of pulses for a full step only results in direct reflection of the amount of deviation on a moving position. Further, if both phase positions at the time of starting motor 1 driving and at the time of stopping are in a middle position within 1 full step, the deviation amount may be accumulated. Accordingly, a proper pulse number suitable for a micro step angle as a portion of each full step must be obtained by using the correction data stored in the memory 4.

Figure 4:
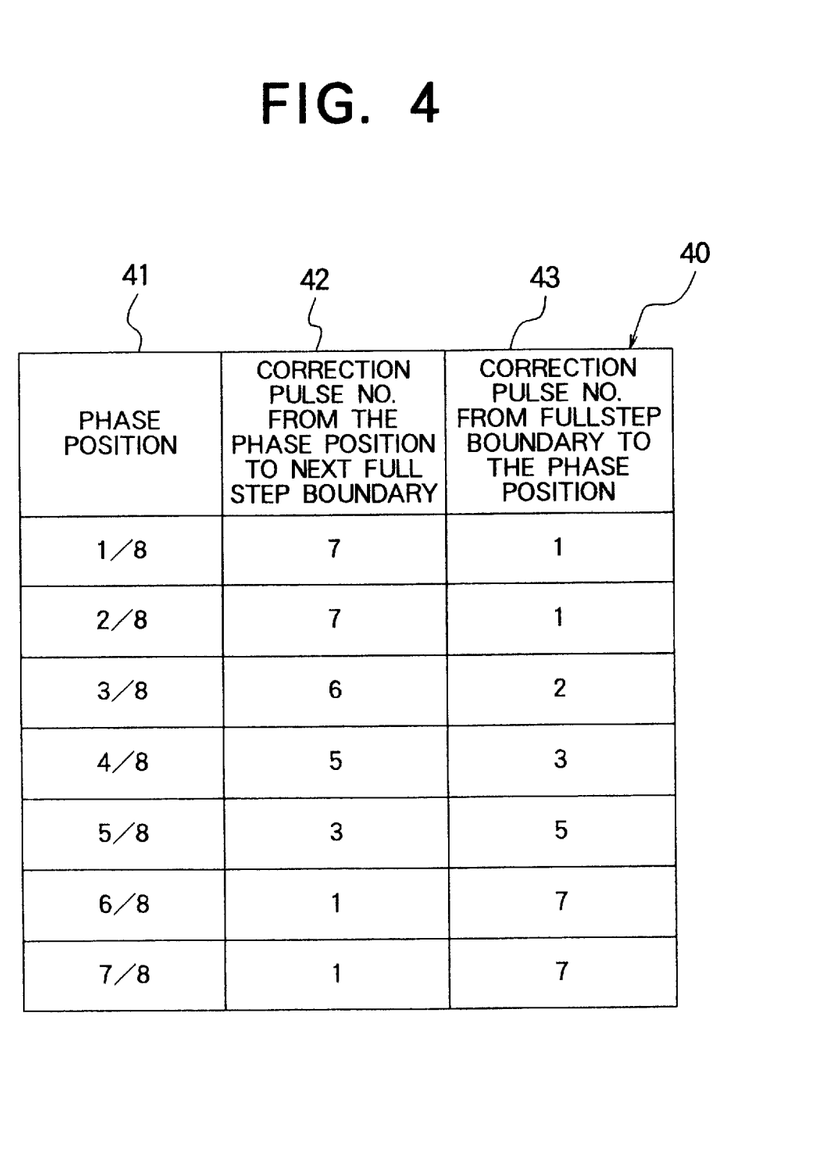
FIG. 4 is a view illustrating correction pulse number data in an embodiment of the present invention.

Referring back to the example of FIG. 3, the correction data for this example is like that shown in FIG. 4. FIG. 4 illustrates a correction pulse number table 40 in the memory 4 in which for each phase position 41, a first correction pulse number 42 necessary for moving from the phase position to a next full step boundary and a second correction pulse number 43 necessary for moving from the full step boundary position to the phase position have been stored in a corresponding manner. Assuming that a current phase position is 2/8, if movement is to be made from this position over a next full step boundary, a first correction pulse number 42 necessary for the movement from the phase position to the full step boundary is "7". It is to be noted that a correction pulse number within 1 full step is always "8" in any full step. If a movement stopping position is a phase position 2/8, a second correction pulse number 43 necessary for movement from a full step boundary position to the phase position is "1". Furthermore, a first correction pulse number 42 necessary for movement from, for instance a phase position 4/8 to a next full step boundary position is "5" and a second correction pulse number 43 necessary for a full step boundary position to the phase position is "3". Accordingly, for example, assuming that a phase position for a movement starting position is 2/8, if movement only by an angle equivalent to {11+(2/8)} is instructed, the CPU 3 first divides this moving amount in the following a manner:

{11+(2/8)}=(6/8)+10+(4/8)}

(6/8) as the first element in the right side corresponds to a moving amount from a phase position 2/8 to a next full step boundary position. The second and third elements in the right side respectively correspond to moving amounts equivalent to remaining 10 full steps and remaining (4/8) full steps. Accordingly, for a correction pulse number corresponding to the (6/8) full step as the first element moving amount, "7" is obtained from the first correction pulse number 42 of the phase position of the table 40 shown in FIG. 4. Similarly, a correction pulse number "3" is obtained from the second correction pulse number 43 of the phase position 4/8 in the table 40 correspondingly to (4/8) as the moving amount of the third element. Since a correction pulse number corresponding to the 10 full step of the second element is "80" as described above, the following is obtained:

Total correction pulse number=7+80+3=90 Accordingly, by supplying 90 correction pulses to the motor drive circuit 2, the motor 1 can be driven by an actual moving amount most approximate to the instructed ideal moving amount.

Since the error of a micro step angle is incorporated in the calculation of a correction step number beforehand as described above, errors generated during driving, measuring, and so on, can be reduced.

Figure 8:
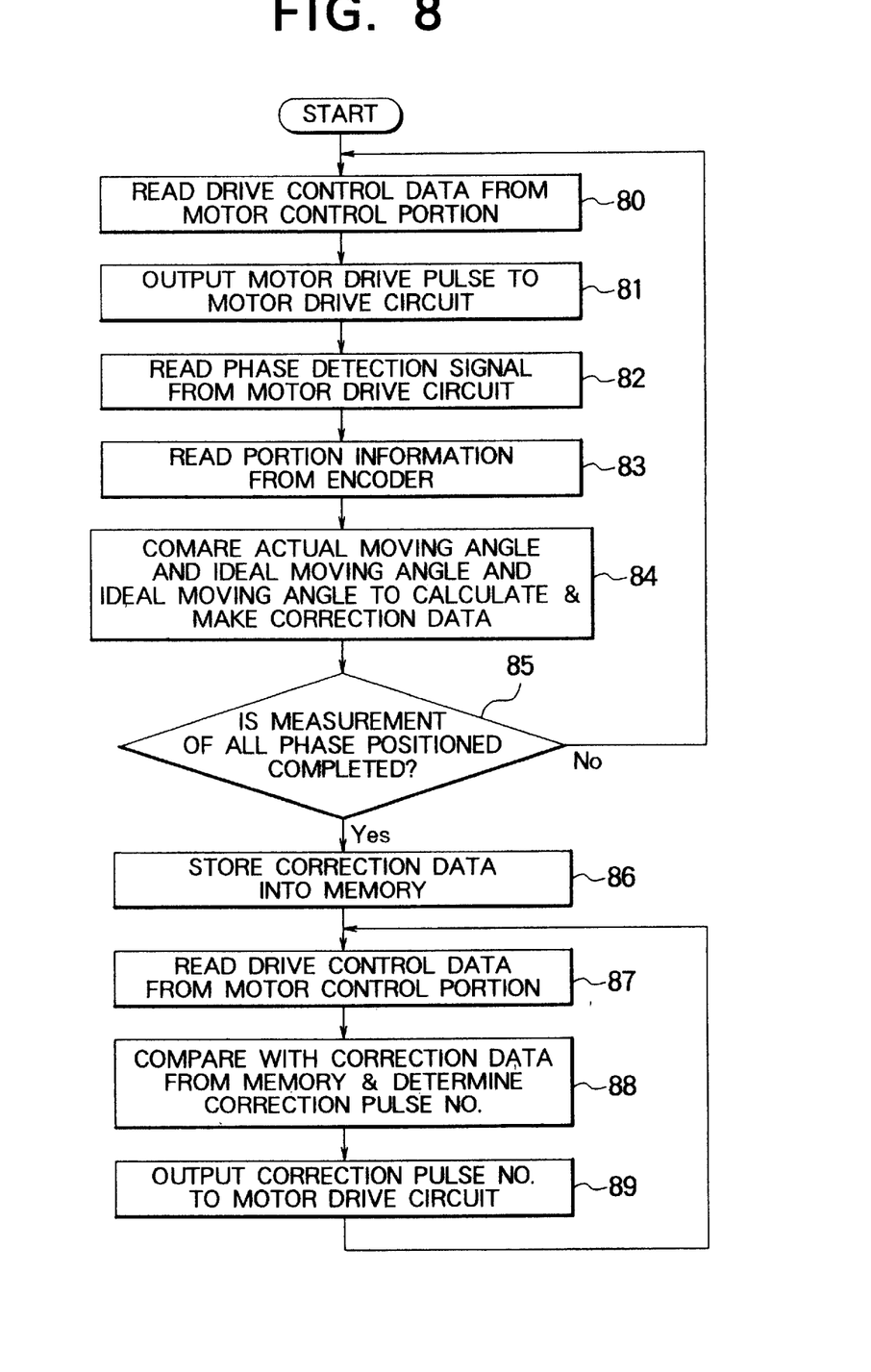
FIG. 8 is a flow chart showing a CPU operation in the device of FIG. 5.

Referring now to FIG. 8, there is shown a flow chart illustrating the operation of the CPU 3 in the device constitution of FIG. 5.

First, drive control data is read in from the motor control portion 5 (step 80). This drive control data is equivalent to a moving amount of one pulse. Then, motor drive pulses corresponding to this drive control data are output to the motor drive circuit 2 (step 81). Then, a phase detection signal is read in from the motor drive circuit 2 (step 82). Current position information is read in from the encoder 6 (step 83). Then, by using the above-noted method, a comparison is made between an actual moving angle and an ideal moving angle and correction data is created (step 84). However, correction data cannot be created by a first round of processing executed in step 84 after the process of FIG. 8 is started since a phase position is determined for the first time in step 83 immediately before. Accordingly, correction data should be created by a next round of processing executed in step 84 after the process is started again from step 80. The operations in steps 80 to 84 are repeated until measuring within 1 full step is finished (step 85).

The correction data obtained in the above-noted manner is then written into the memory 4 (step 86). This correction data was shown in the form of the table 40 in FIG. 4, but a data storing form can be freely selected. Instead of holding data in such a table, the data may be incorporated as constants in an actual motor control program (e.g., automatic focusing control program of a camera).

Operations in subsequent steps 87, 88 and 89 are the same as those in steps 74, 75 and 76 shown in FIG. 7 and thus, explanation of these will be omitted.

In the foregoing description, only the case of forward motor rotation was considered for the correction data. It should be noted, however, that although similar correction is performed when the motor is rotated backward, if the motor is operated from a forward direction to a backward direction, since hysteresis occurs, correction must be performed by adding a pulse for correcting the hysteresis.

The present invention has been described in the manner that 1 full step is stored in the memory as correction data. However, there is no particular limitation in this regard. Data for several full steps may be stored in the memory. For example, correction data may be created by using a motor exciting pattern as a unit.

According to the present invention, micro step driving precision can be improved for the stepping motor and in the closed control, a converging speed is increased and thereby overshooting, hunting, and so on, can be prevented.

Although the preferred embodiment of the present invention has been described in detail, it should be understood that various changes, substitutions and alternations can be made therein without departing from spirit and scope of the inventions defined by the appended claims.

What is claimed is:

1. A stepping motor driving device which supplies a drive pulse number obtained by dividing a specified number of drive pulses as one basic unit to a stepping motor in order to make the stepping motor perform micro step driving, said stepping motor performing full step driving by receiving said specified number of drive pulses as one group unit, comprising:

a computing unit for computing ideal moving amounts for driving of said stepping motor depending on a drive pulse number as an integral multiple of said one basic unit by dividing a moving amount when said stepping motor is driven in response to drive pulses of said one group unit;

a detector for obtaining actual moving amounts when said stepping motor is driven depending on said drive pulse number as an integral multiple of said one basic unit;

a memory device for storing drive pulse numbers when said stepping motor is actually moved only by a moving amount closest to one of said ideal moving amounts correspondingly to said ideal moving amounts;

a determining device for determining a drive signal in accordance with a desired moving amount of said stepping motor to be driven and one of said drive pulse numbers stored in said memory device; and an output device for outputting said drive signal to said stepping motor.

2. A stepping motor driving device for enabling a stepping motor which performs full step driving to perform micro step driving whose drive unit is smaller than that of said full step driving comprising:

an instruction device for issuing instruction as to a desired moving amount of said stepping motor;

a controller for outputting a number of drive pulses in accordance with said desired moving amount instructed by said instruction device;

a drive circuit for driving said stepping motor in response to said drive pulses; and a memory device for obtaining an actual moving amount when said stepping motor is driven in accordance with said micro step driving and for storing a number of drive pulses as a correction pulse number when said stepping motor is actually moved only by a moving amount closest to one of ideal moving amounts for driving of said stepping motor correspondingly to said ideal moving amounts, wherein said controller corrects a number of drive pulses to be output in accordance with said desired moving amount of said stepping motor to be driven and said correction pulse number stored by said memory device, when micro step driving is determined to be necessary in response to instruction issued by said instruction device.

3. A stepping motor driving device according to claim 2, wherein said memory device stores a correction pulse number for each integral multiple of one unit of micro step driving within a range of one unit of full step driving.

4. A stepping motor driving device according to claim 2, wherein said controller performs a controlling operation such that a correction pulse number corresponding to a moving amount from a current position to a full step boundary closest to said current position is included in said driving pulse number to be output when a current position of said stepping motor is in a position between full step boundaries set for each unit of full step driving and said stepping motor is determined to be driven beyond said full step boundaries.

5. A stepping motor driving device according to claim 2, wherein said controller performs a controlling operation such that a correction pulse number corresponding to a moving amount from a full step boundary closest to a desired position to said desired position is included in said correction pulse number to be output when said desired position of said stepping motor to be driven is in a position between full step boundaries set for each unit of full step driving and said stepping motor is determined to be driven from a current position beyond said full step boundaries.

6. A stepping motor driving device according to claim 2, wherein said drive circuit supplies a position detection signal indicating a current position of said stepping motor to said controller; and said controller divides a desired moving amount instructed by said instruction device into a first moving amount from said current position to a full step boundary set for each unit of full step driving, a second moving amount corresponding to an integral multiple of one unit of full step driving and a third moving amount from said full step boundary to a desired position and outputs correction pulse numbers corresponding to said first and third moving amounts.

7. A stepping motor driving device according to claim 3, further comprising:

a detector for detecting an error between an actual moving amount and an ideal moving amount when said stepping motor is driven based on said micro step driving; and     a determining device for determining said correction pulse number based on said difference.

\* \* \* \* \*